(12) United States Patent
Ma et al.

(10) Patent No.: US 11,704,093 B2
(45) Date of Patent: Jul. 18, 2023

(54) RAPID PROTOTYPING OF USER EXPERIENCE COMPONENTS AND RELATED APPLICATION FUNCTIONALITY

(71) Applicant: salesforce.com, inc., San Francisco, CA (US)

(72) Inventors: Billy Ma, San Francisco, CA (US); Brian Truong, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 66 days.

(21) Appl. No.: 17/485,702

(22) Filed: Sep. 27, 2021

(65) Prior Publication Data

US 2023/0108375 A1 Apr. 6, 2023

(51) Int. Cl.
*G06F 9/44* (2018.01)
*G06F 8/20* (2018.01)
*G06F 9/451* (2018.01)
*G06F 8/10* (2018.01)
*G06F 8/38* (2018.01)

(52) U.S. Cl.
CPC .............. *G06F 8/20* (2013.01); *G06F 9/451* (2018.02); *G06F 8/10* (2013.01); *G06F 8/38* (2013.01)

(58) Field of Classification Search
CPC .............. G06F 8/20; G06F 8/38; G06F 8/10; G06F 9/451
See application file for complete search history.

(56) References Cited

U.S. PATENT DOCUMENTS

| | | | |
|---|---|---|---|
| 2009/0113385 A1* | 4/2009 | Appleyard et al. ...... | G06F 8/20 717/116 |
| 2016/0283893 A1* | 9/2016 | Dhiman et al. ........ | G06Q 10/06 |
| 2021/0150263 A1* | 5/2021 | Corwin et al. ....... | G06F 40/186 |

OTHER PUBLICATIONS

Ignacio Alvarez et al., Skyline: a Rapid Prototyping Driving Simulator for User Experience , Sep. 01-03, 2015, [Retrieved on Jan. 4, 2023]. Retrieved from the internet: <URL: https://dl.acm.org/doi/pdf/10.1145/2799250.2799290> 8 pages (101-108) (Year: 2015).*
Sarah Suleri et al., Impact of using UI Design Patterns on the Workload of Rapid Prototyping of Smartphone Applications: An Experimental Study, 2020, [Retrieved on Jan. 4, 2023]. Retrieved from the internet: <URL: https://dl.acm.org/doi/pdf/10.1145/3406324.3410718> 5 Pages (1-5) (Year: 2020).*

* cited by examiner

*Primary Examiner* — Anibal Rivera
(74) *Attorney, Agent, or Firm* — Butzel Long

(57) ABSTRACT

Methods, computer readable media, and devices for rapid prototyping of both user experience and technical features in a combined approach. One method may include creating a set of known user experience (UX) components including a user interface element representing at least one of a data element and a data interaction, creating a UX screen including a set of UX elements within a UX prototyping tool, translating the UX screen into a set of standardized UX components, publishing the set of standardized UX components by mapping the set of standardized UX components to synthetic data, and validating a technical aspect of the published set of standardized UX components based on user interaction with the published set of standardized UX components.

15 Claims, 4 Drawing Sheets

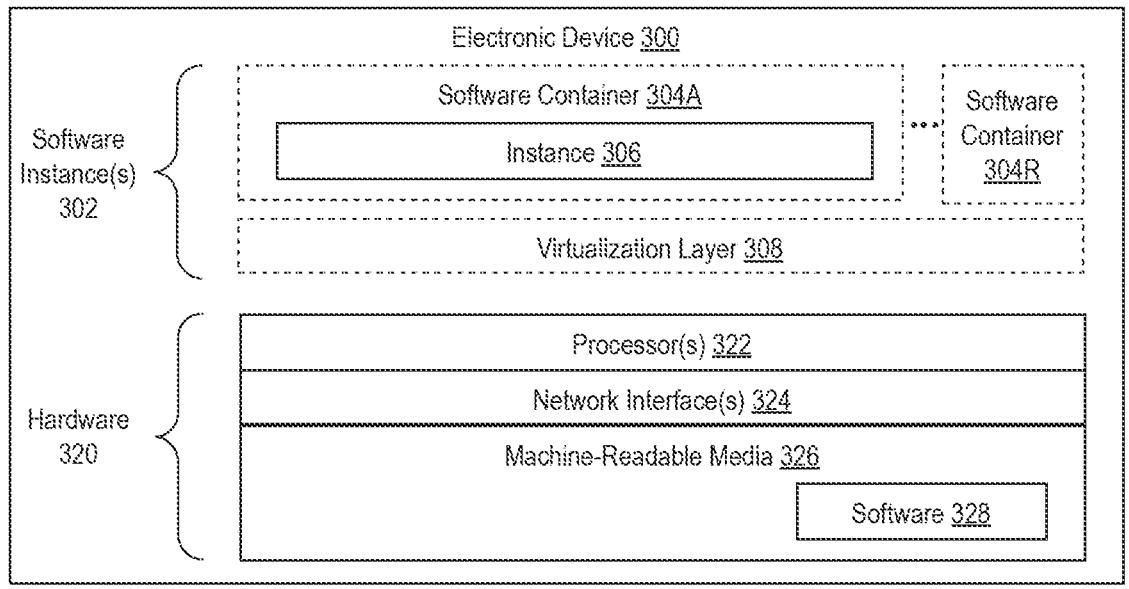
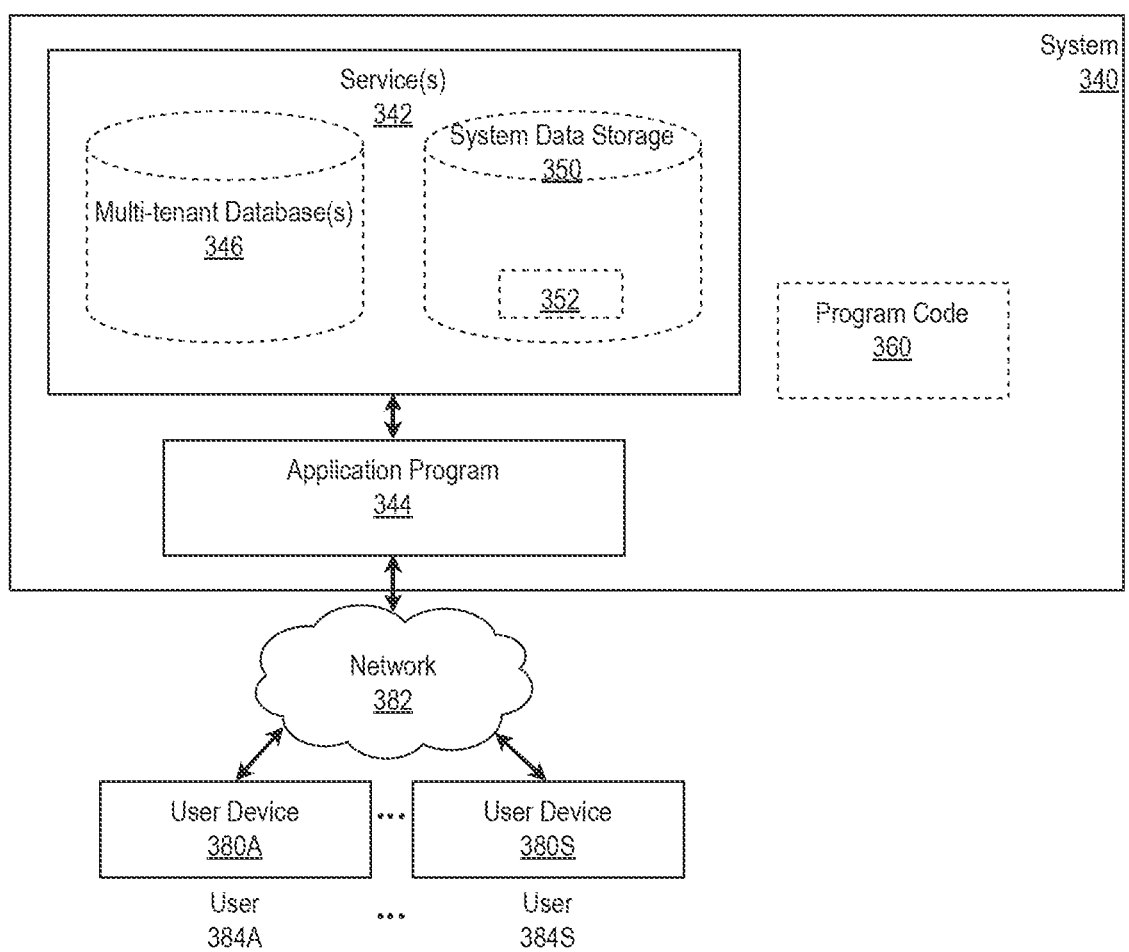

RAPID PROTOTYPING OF USER EXPERIENCE COMPONENTS AND RELATED APPLICATION FUNCTIONALITY

TECHNICAL FIELD

Embodiments disclosed herein relate to techniques and systems for rapid prototyping of both user experience and technical features in a combined approach.

BACKGROUND

In a traditional approach, a rapid prototype may focus on a user experience or a technical aspect of a solution. However, a typical rapid prototype does not focus on both user experience and technical aspects of the solution

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 3A is a block diagram illustrating an electronic device according to some example implementations.

FIG. 3B is a block diagram of a deployment environment according to some example implementations.

DETAILED DESCRIPTION

Figure 1:
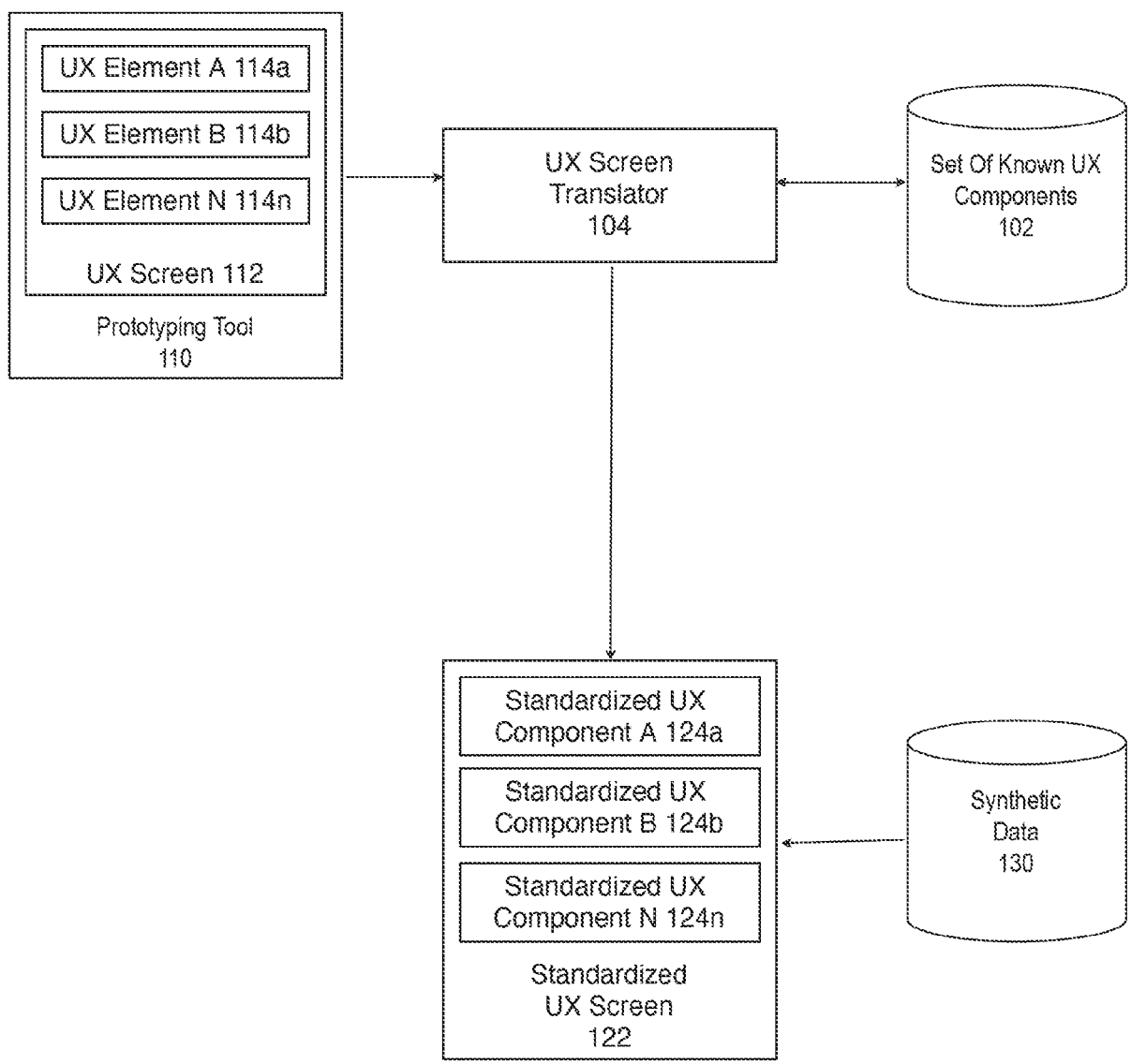
FIG. 1 is a block diagram illustrating a system for rapid prototyping of both user experience and technical features in a combined approach according to some example implementations.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Embodiments disclosed herein provide techniques and systems for generating a rapid prototype that enables validation of both a user experience (UX) and technical aspects of a solution. In particular, disclosed embodiments may enable an improved development process by enabling real time collaboration between a UX designer and technical engineer utilizing standardized UX components that reference synthetic data to provide feedback.

A primary purpose of a software prototype may be to validate various key factors of a concept before running at full spend. Key factors may generally be grouped into 2 categories: user experience, such as feature discovery, workflow, and the like; and technical, such as feasibility, application programming interface (API), scale, and the like. However, a traditional approach to prototyping may typically only address one of these 2 categories. In various implementations of the disclosed subject matter, both user experience and technical aspects of a prototype may be validated.

In various implementations, a UX designer may create a UX screen within a UX prototyping tool, such as Figma, Sketch, or the like. As part of creating the UX screen, the UX designer may annotate data information into corresponding text regions. For example, the designer may enter static content, such as "Welcome to Prototype", into a static text region, structured data, such as "Person.FirstName" or "Opportunity.Name", into a structured text region, and/or a service, such as "ListViewService.Opportunity", into a service text region. The designer may also annotate interaction information into corresponding regions. For example, navigation, such as "Show X region", input, such as "Enter Text Here", and action, such as "Update a particular record". That is, the designer not only designs a screen, but also describes various regions, or components, within the screen.

Once the UX designer completes the UX screen, the designer may initiate a validation process. The validation process may take into account, for example, accessibility compliance based on web content accessibility guidelines (WCAG) 2.1 standard, design system (e.g., organizational guidelines), data and interaction annotations, or the like. Once validated, the UX screen may be published.

In various implementations, publishing the UX screen may include, for example, translating or otherwise replacing UX components within the screen with predefined standardized UX components, mapping the UX components to synthetic data, and capturing statistics and other information about the UX screen. For example, the various UX components and associated annotated information may be transformed into JavaScript object notation (JSON) data and the JSON data may go through a series of processes to generate artifacts that run in a desired environment. The processes may include, for example, grouping similar elements to identify component candidates, matching component candidates to an existing set of known components, matching style declarations, generating a corresponding network request and state map based on data information, binding state to corresponding components, and connecting an experience using interaction information. In some implementations, an identified component candidate may not have a matching known component and, in this case, an option may be provided to include the identified component candidate in the set of known components.

In various implementations, once artifacts are generated, the artifacts (i.e., UX screen including standardized UX components) may be deployed to a stand-alone system that includes, for example, synthetic behavior based on data and interaction information and instrumentation. For example, synthetic behavior may provide structured data (e.g., replace "Person.FirstName" with "John") and services (e.g., "ListViewService.Opportunity" may leverage annotated schema) while instrumentation may provide statistics or other information, such as click path, response time, and the like. Once deployed, an address, such as a web address, may be provided so that the UX designer and/or others may access the published UX screen.

In various implementations, an engineer or other developer may, for example, collaborate with the UX designer by interacting with the published UX screen. In some implementations, such collaboration may be in real time or near real time. For example, selected changes may be made in real time to see any impact through code, styles, and annotated schema change. Similarly, bi-directional updates may be made between the published screen and the UX prototyping tool. In another example, various factors may be adjusted between concept testing to explore response and such information may be captured and recorded with the instrumentation. For example, an entire workflow may be slowed by three times (3×) to gauge a user's attention.

In this way, rapid prototyping that includes validation of both use experience and technical aspects may be performed. Such approach may increase collaboration between design and technical staff and improve an overall development process.

Implementations of the disclosed subject matter provide methods, computer readable media, and devices for rapid prototyping of user experience components and related application functionality. In various implementations, a method for rapid prototyping may include creating a set of known user experience (UX) components, creating a UX screen including a set of UX elements within a prototyping tool, translating the UX screen into a set of standardized UX components, publishing the set of standardized XU components by mapping the set of standardized UX components to synthetic data, and validating a technical aspect of the published set of standardized UX components based on user interaction with the published set of standardized UX components. In some implementations, a UX component may include a user interface element representing at least one of a data element and a data interaction. In some implementations, the UX screen may be translated into the set of standardized UX components by creating a reference UX component which may be a component representation of at least one UX element, comparing the reference UX component to the set of known UX components to identify a matching known UX component, and replacing the reference UX component with the matching known UX component in the set of standardized UX components.

In some implementations, a user interface element may include a hypertext markup language (HTML) element.

In some implementations, at least one known UX component of the set of known UX components may include a user interface element and a component element, the component element being a reference to another known UX component.

In some implementations, creating a UX screen within a UX prototyping tool may include, for at least one UX element in the set of UX elements, annotating data information associated with the at least one UX element and, for at least one UX element in the set of UX elements, annotating interaction information associated with the at least one UX element.

The UX prototyping tool may be any suitable off-the-shelf or custom software, such as Figma, available from Figma, Inc., Sketch, available from Sketch BV, Adobe XD from Adobe Systems, or the like.

FIG. 1 illustrates a system 100 for rapid prototyping of both user experience and technical features in a combined approach according to various implementations of the subject matter disclosed herein. In various implementations, a prototyping tool 110 may be utilized to create a user experience (UX) screen 112. UX screen 112 may include, for example, UX elements A...N 114a...n. Each UX element may represent, for example, a piece of information to be provided via a user interface and/or an interaction with the user interface. For example, UX element A 114a may represent a piece of information, such as text, to be provided and UX element B 114a may represent a data entry field, such as a prompt to enter a name or other information. Further in this example, UX element N 114n may represent information provided as a result of some interaction with or execution of processing, such as a query, calculation, or the like. Although the various examples describe a UX element as a single element, this is only for simplicity and an element may be a complex element including more than one element.

In various implementations, UX screen 112 may be provided as input to UX screen translator 104. UX screen translator 104 may, for example, translate UX screen 112 into standardized UX screen 122. That is, UX screen translator 104 may, for example, receive input from any of a variety of different prototyping tools and translate the varying inputs into standardized output, such as standardized UX screen 122. As part of the translation process, UX screen translator 104 may reference or otherwise utilize a set of known UX components 102. For example, an organization may have defined or otherwise identified a standard look and feel to be provided in a user interface (e.g., font, font size, element size, spacing, image size, etc.) and the set of known UX components 102 may include predefined elements that encapsulate these preferences. In this example, UX screen translator 104 may compare the various elements of UX screen 122 with predefined elements in the set of known UX components 102 and replace the various elements with matching standardized elements. For example, standardized UX component A 124a may be the standardized element that matches UX element A 114a, standardized UX component B 124b may be the standardized element that matches UX element B 114b, and standardized UX component N 124n may be the standardized element that matches UX element N 114n. Thus, standardized UX screen 122 may represent, for example, UX screen 112 in a standardized form that conforms with the standard look and feel of the organization. In this way, UX screen translator 104 may also validate various user experience aspects of standardized UX screen 122.

In some implementations, a UX element may not match any standardized elements. In this situation, an option may be provided to adopt the UX element as a standardized element. For example, UX element N 114n may not match any component in the set of known UX components 102. In this example, an option may be provided to include UX element N 114n in the set of known UX components 102 and UX element N 114n may be placed in standardized UX screen 122 as standardized UX component N 124n. In this way, the set of known UX components 102 may include, for example, not only predefined components, but also subsequently identified components.

In various implementations, standardized UX screen 122 may also be mapped, for example, to synthetic data 130. Synthetic data 130 may include, for example, various elements of synthetic or artificial data. That is, synthetic data 130 may be data that may be used to test functional aspects of standardized UX screen 122. For example, standardized UX screen 122 may be published or otherwise provided to an engineer that may interact with the various elements using synthetic data 130 to test various technical aspects of standardized UX screen 122. The results of such testing may be provided, for example, back to a designer of UX screen 112. The designer may implement changes to UX screen 112, which may be again translated into an updated standardized UX screen and the engineer may continue to perform testing. By utilizing UX screen translator 104 to validate and generate standardized UX elements, the designer may focus on utilizing a prototyping tool preferred by the designer to design UX screens and an engineer may focus on testing those UX screens without any delay. As such, collaboration between designer and engineer may be increased while also improving validation of both design and technical aspects of a prototyped screen.

Figure 2A:
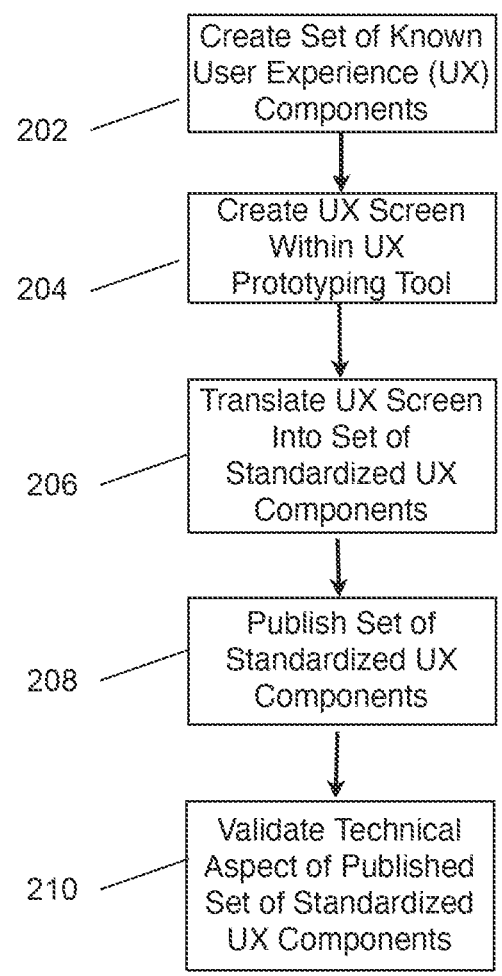
FIG. 2A is a flow diagram illustrating a method for rapid prototyping of both user experience and technical features according to some example implementations.

FIG. 2A illustrates a method 200 for rapid prototyping of user experience components and related application functionality, as disclosed herein. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, a set of known user experience (UX) components may be created. In various implementations, the set of known UX components may include, for example, components previously created to conform to a standard, such as a standard defined by an organization to provide a consistent look and feel for various UX screens. The various components or elements may represent, for example, static content, structured data, services, and/or some combination. That is, a component may represent a single element or a combination of elements. In some implementations, a UX component may be a hypertext markup language (HTML) element.

In step 204, a UX screen may be created within a UX prototyping tool. In various implementations, the UX screen may include, for example, a set of UX elements as well as data information and/or interaction information annotations. For example, a static content UX element may be annotated with static content, such as "Welcome to Prototype", a structured data UX element may be annotated with structured date, such as "Person.FirstName" or "Opportunity.Name", and a services UX element may be annotated with a service, such as "ListViewService.Opportunity". In this example, a navigation UX element may be annotated with navigation, such as "show X region", an input UX element may be annotated with input, such as "enter text here", and an action UX element may be annotated with an action, such as "update a particular record".

In step 206, a UX screen may be translated into a set of standardized UX components. In various implementations, the UX screen may be translated, for example, utilizing the set of known UX components. That is, UX elements created in any of a number of various different prototyping tools may be translated into standardized UX components. As part of the translation process, the various UX elements within the UX screen may be validated for a variety of design aspects. The translation process may involve a process as described in greater detail below in relation to FIG. 2B.

In step 208, the set of standardized UX components may be published. In various implementations, publishing the set of standardized UX components may include, for example, mapping the various standardized UX components to synthetic data. As a result of publishing, an address, such as a web address, may be provided so that an engineer or other party may access the published standardized UX components.

In step 210, a technical aspect of the published set of standardized UX components may be validated. In various implementations, technical aspects may be validated, for example, by an engineer or other party accessing and interacting with the published UX components. For example, an engineer may access the published UX screen and interactions with the screen may be recorded or otherwise noted.

The recorded interactions may than be evaluated in order to validate technical aspects of the UX components. Although not explicitly shown, such evaluations may be shared with the designer or other party and, as needed, method 200 may be repeated.

Figure 2B:
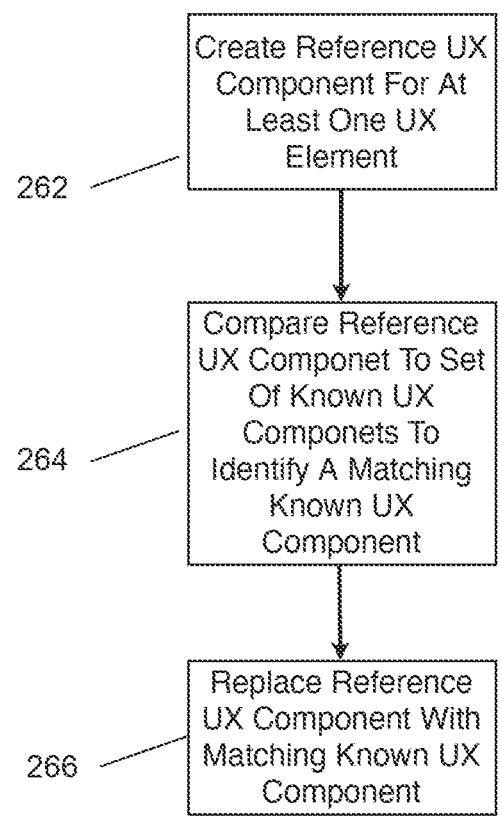
FIG. 2B is a flow diagram illustrating a method for translating a user experience screen according to some example implementations.

FIG. 2B illustrates a method 260 for translating a user experience screen, as disclosed herein. In various implementations, the steps of method 260 may be performed by a server, such as electronic device 300 of FIG. 3A or system 340 of FIG. 3B, and/or by software executing on a server or distributed computing platform. Although the steps of method 260 are presented in a particular order, this is only for simplicity.

In step 262, a reference UX component may be created for at least one UX element of a UX screen. In various implementations, the reference UX component may include, for example, the UX element modified to include metadata describing a web component directive (e.g., for: each, iterator, if:true, etc.) and normalized to account for supported tags. For example, if a UX element includes an unsupported tag, a reference UX component for that UX element may replace the unsupported tag with a supported tag or remove the unsupported tag.

In step 264, at least one reference UX component may be compared to a set of known UX components to identify a matching known UX component. In various implementations, such matching may be performed, for example, by treating a reference UX component and at least one known UX component as trees where each HTML element represents a node and any nested elements represent children on that node. For example, a root element of a reference UX component may be compared with a root element of a known UX component. If the two root elements match, the children may be traversed and compared. If all elements of both the reference UX component and the known UX component match, then the two components match. Otherwise, the reference UX component may be compared to another known UX component.

In step 266, a reference UX component may be replaced with a matching known UX component. In various implementations, a matching known UX component may replace a reference UX component in order to provide a UX screen including standardized UX components.

As disclosed herein, validation of both design and technical aspects of a rapid prototype may be performed by translating UX components of a prototyping tool into standardized UX components and publishing the standardized UX components mapped to synthetic data. In this way, a designer may work with any preferred prototyping tool and an engineer may be able to interact with published components to validate technical aspects while both designer and engineer collaborate to address deficiencies, often in real time or near real time. In this way, rapid prototyping may be enhanced and improved to reduce development time.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals - such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and consolidated order manager may be implemented in one or more electronic devices 300.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

FIG. 3B is a block diagram of a deployment environment according to some example implementations. A system 340 includes hardware (e.g., a set of one or more server devices) and software to provide service(s) 342, including a consolidated order manager. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4$^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for rapid prototyping, the method comprising:
    creating a set of known user experience (UX) components, wherein a UX component comprises a user interface element representing at least one of a data element and a data interaction;
    creating a UX screen within a UX prototyping tool, the UX screen comprising a set of UX elements;
    translating the UX screen into a set of standardized UX components by:
        for at least one UX element of the set of UX elements, creating a reference UX component, the reference UX component being a component representation of the at least one UX element;
        comparing the reference UX component to the set of known UX components to identify a matching known UX component; and
        replacing the reference UX component with the matching known UX component in the set of standardized UX components;
    publishing the set of standardized UX components by mapping the set of standardized UX components to synthetic data; and
    validating a technical aspect of the published set of standardized UX components based on user interaction with the published set of standardized UX components.

2. The computer-implemented method of claim 1, wherein a user interface element comprises a hypertext markup language (HTML) element.

3. The computer-implemented method of claim 1, wherein at least one known UX component of the set of known UX components comprises a user interface element and a component element, the component element being a reference to another known UX component.

4. The computer-implemented method of claim 1, wherein creating a UX screen within a UX prototyping tool comprises:
    for at least one UX element in the set of UX elements, annotating data information associated with the at least one UX element; and
    for at least one UX element in the set of UX elements, annotating interaction information associated with the at least one UX element.

5. The computer-implemented method of claim 1, wherein the UX prototyping tool is selected from the list comprising:
    figma; and
    sketch.

6. A non-transitory machine-readable storage medium that provides instructions that, if executed by a processor, are configurable to cause the processor to perform operations comprising:
    creating a set of known user experience (UX) components, wherein a UX component comprises a user interface element representing at least one of a data element and a data interaction;
    creating a UX screen within a UX prototyping tool, the UX screen comprising a set of UX elements;
    translating the UX screen into a set of standardized UX components by:
        for at least one UX element of the set of UX elements, creating a reference UX component, the reference UX component being a component representation of the at least one UX element;
        comparing the reference UX component to the set of known UX components to identify a matching known UX component; and
        replacing the reference UX component with the matching known UX component in the set of standardized UX components;
    publishing the set of standardized UX components by mapping the set of standardized UX components to synthetic data; and
    validating a technical aspect of the published set of standardized UX components based on user interaction with the published set of standardized UX components.

7. The non-transitory machine-readable storage medium of claim 6, wherein a user interface element comprises a hypertext markup language (HTML) element.

8. The non-transitory machine-readable storage medium of claim 6, wherein at least one known UX component of the set of known UX components comprises a user interface element and a component element, the component element being a reference to another known UX component.

9. The non-transitory machine-readable storage medium of claim 6, wherein creating a UX screen within a UX prototyping tool comprises:
    for at least one UX element in the set of UX elements, annotating data information associated with the at least one UX element; and
    for at least one UX element in the set of UX elements, annotating interaction information associated with the at least one UX element.

10. The non-transitory machine-readable storage medium of claim 6, wherein the UX prototyping tool is selected from the list comprising:
    figma; and
    sketch.

11. An apparatus comprising:
    a processor; and
    a non-transitory machine-readable storage medium that provides instructions that, if executed by a processor, are configurable to cause the processor to perform operations comprising:
        creating a set of known user experience (UX) components, wherein a UX component comprises a user interface element representing at least one of a data element and a data interaction;
        creating a UX screen within a UX prototyping tool, the UX screen comprising a set of UX elements;
        translating the UX screen into a set of standardized UX components by:
            for at least one UX element of the set of UX elements, creating a reference UX component, the reference UX component being a component representation of the at least one UX element;
            comparing the reference UX component to the set of known UX components to identify a matching known UX component; and
            replacing the reference UX component with the matching known UX component in the set of standardized UX components;

publishing the set of standardized UX components by mapping the set of standardized UX components to synthetic data; and validating a technical aspect of the published set of standardized UX components based on user interaction with the published set of standardized UX components.

12. The apparatus of claim 11, wherein a user interface element comprises a hypertext markup language (HTML) element.

13. The apparatus of claim 11, wherein at least one known UX component of the set of known UX components comprises a user interface element and a component element, the component element being a reference to another known UX component.

14. The apparatus of claim 11, wherein creating a UX screen within a UX prototyping tool comprises:

for at least one UX element in the set of UX elements, annotating data information associated with the at least one UX element; and for at least one UX element in the set of UX elements, annotating interaction information associated with the at least one UX element.

15. The apparatus of claim 11, wherein the UX prototyping tool is selected from the list comprising:

figma; and sketch.

* * * * *